(12) United States Patent
Sayag

(10) Patent No.: US 8,182,089 B2
(45) Date of Patent: May 22, 2012

(54) APPARATUS FOR DETERMINING THE ORIENTATION OF OPHTHALMIC LENSES BELONGING TO A FRAME

(75) Inventor: Jean-Philippe Sayag, Paris (FR)

(73) Assignee: Acep France (FR)

( * ) Notice: Subject to any disclaimer, the term of this patent is extended or adjusted under 35 U.S.C. 154(b) by 0 days.

(21) Appl. No.: 12/991,989

(22) PCT Filed: May 5, 2009

(86) PCT No.: PCT/FR2009/000532
§ 371 (c)(1),
(2), (4) Date: Jan. 27, 2011

(87) PCT Pub. No.: WO2009/141529
PCT Pub. Date: Nov. 26, 2009

(65) Prior Publication Data
US 2011/0128495 A1    Jun. 2, 2011

(30) Foreign Application Priority Data
May 15, 2008   (FR) .................................... 08 02624

(51) Int. Cl.
*A61B 3/10* (2006.01)
*A61B 3/00* (2006.01)
(52) U.S. Cl. ........................................ 351/204; 351/246
(58) Field of Classification Search ............ 33/200; 351/204, 246; 356/124
See application file for complete search history.

(56) References Cited

U.S. PATENT DOCUMENTS

| 2007/0195266 A1 | 8/2007 | Kubitza et al. |
| 2009/0262302 A1 | 10/2009 | Chauveau et al. |
| 2010/0149486 A1 | 6/2010 | Sayag |
| 2010/0231710 A1 | 9/2010 | Sayag |

FOREIGN PATENT DOCUMENTS

| FR | 2896682 A | 8/2007 |
| FR | 2903504 | 1/2008 |
| FR | 2906047 A | 3/2008 |
| WO | WO 2007/128925 A | 11/2007 |
| WO | WO 2008/003897 A2 | 1/2008 |
| WO | WO 2008/003897 A3 | 1/2008 |

OTHER PUBLICATIONS

International Search Report dated Nov. 11, 2009, issued in corresponding international application No. PCT/FR2009/000532.

*Primary Examiner* — Ricky Mack
*Assistant Examiner* — Mahidere Sahle
(74) *Attorney, Agent, or Firm* — Ostrolenk Faber LLP

(57) ABSTRACT

The present disclosure relates to an apparatus for determining the orientation of ophthalmic lenses (20, 22). The apparatus includes a recording device and a reference-frame unit that can be fitted onto a frame (14) while a patient is wearing it. Said frame has two half parts (11, 13) and a central bridge (15). The reference-frame unit includes a first element forming an arch (24) that has a central portion (26) indicated by a first reference mark (54), and a second element (56) indicated by a second reference mark (58), mounted on said frame. According to the disclosure, the apparatus includes two cameras (60,62) separated vertically from each other and pointing at the eyes from two angles of view (64, 66); and the two cameras (60, 62) enable two images of said reference-frame unit (24, 56) to be recorded simultaneously in order to evaluate the relative positions of the two reference marks (54, 58) and provide a value that represents the slope of said half parts (11, 13).

11 Claims, 2 Drawing Sheets

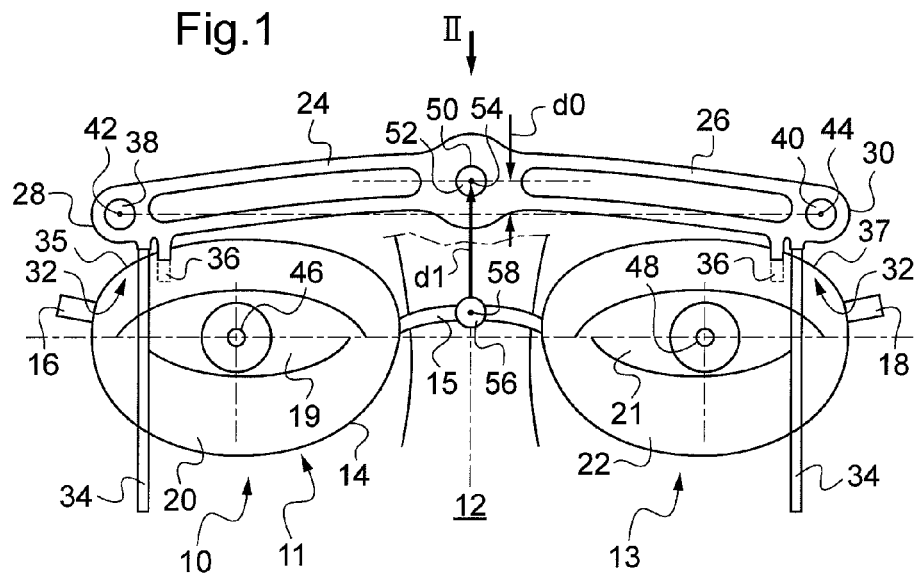
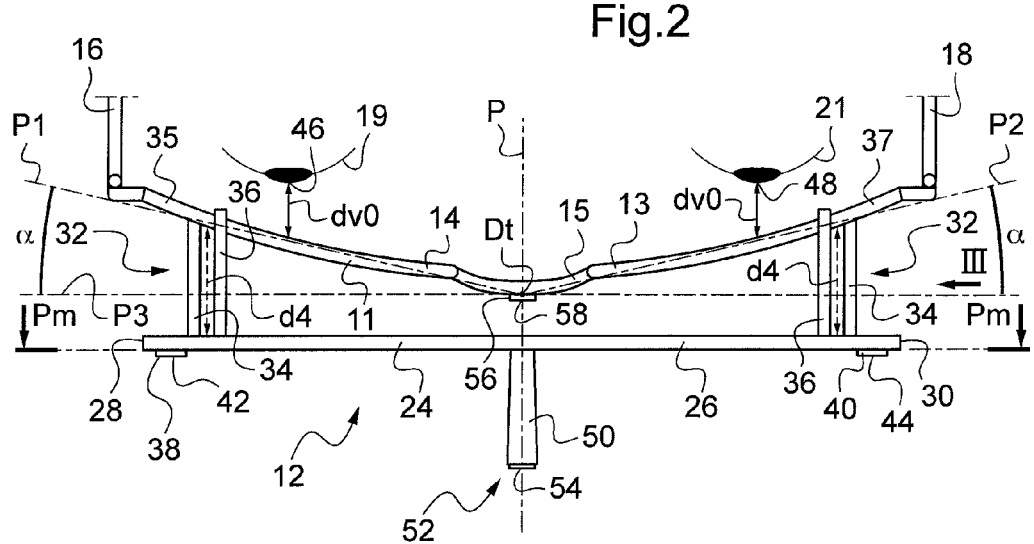

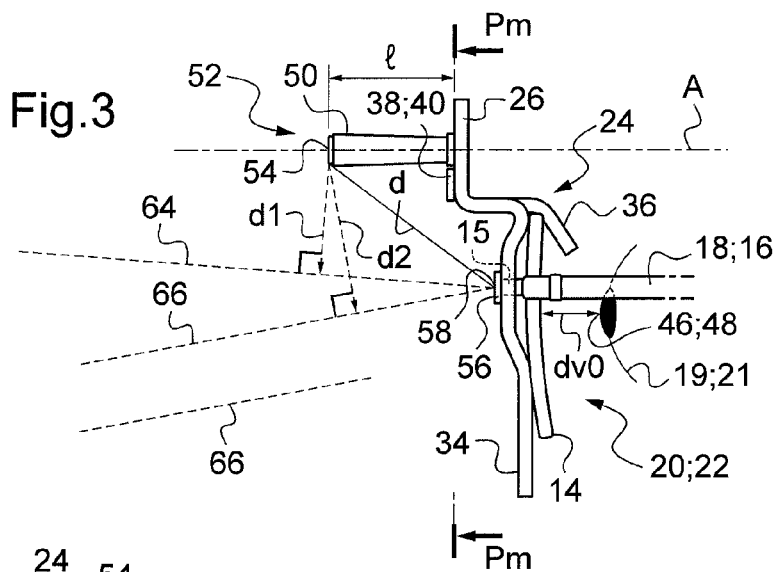
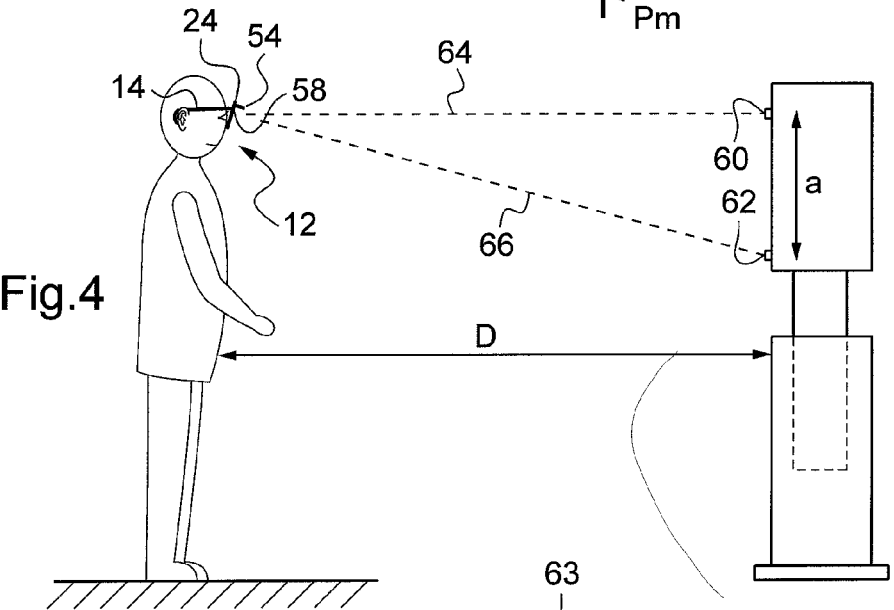
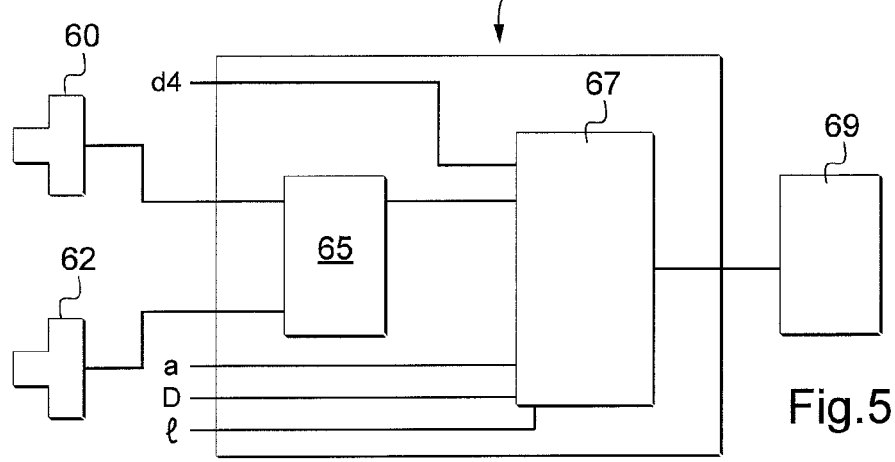

US 8,182,089 B2

APPARATUS FOR DETERMINING THE ORIENTATION OF OPHTHALMIC LENSES BELONGING TO A FRAME

CROSS REFERENCE TO RELATED APPLICATIONS

The present application is a 35 U.S.C. §371 National Phase conversion of PCT/FR2009/000532, filed May 5, 2009, which claims benefit of French application Ser. No. 08/02624, filed May 15, 2008, the disclosure of which is incorporated herein by reference. The PCT International Application was published in the French language.

BACKGROUND OF THE INVENTION

The present invention relates to an apparatus for determining the orientation of the ophthalmic lenses belonging to a frame and to a method for determining the orientation of the ophthalmic lenses belonging to a frame likely to be implemented by virtue of said apparatus.

There are already known installations for measuring this orientation and more specifically for measuring the curvature of the frame.

The frames, commonly called spectacle frames, comprise two receiving half-parts forming two receptacles and into which the ophthalmic lenses are respectively driven. The two half-parts are linked together by a central bridge and they are respectively equipped with two arms opposite the central bridge. In this way, said two receiving half-parts extend symmetrically to one another relative to a main plane of symmetry dissecting said central bridge. Thus, the frames are designed to be adjusted on the face of a patient, the central bridge resting on his nose, the two half-parts respectively in front of his eyes and the two arms respectively on his ears. The curvature then represents the inclination of the two receiving half-parts, and consequently of the ophthalmic lenses, relative to a plane perpendicular to the abovementioned main plane of symmetry, or quite simply to the inclination of the two receiving half-parts, one relative to the other; an inclination of 180° would then correspond to a zero curvature.

The known apparatuses comprise a recording device, which includes a digital camera and means for processing the image supplied by the camera. They also comprise a first positioner element provided with a first reference mark and a second positioner element provided with a second reference mark. The first positioner element can be adjusted on the spectacle frame by defining a median plane of the frame, whereas the second positioner element is adjusted on the frame so as to define an orientation of the receiving half-parts.

Reference should be made to the document FR 2 903 504, which describes such an apparatus.

Thus, by virtue of the camera used to record an image of the positioner elements resting on the frame which is in turn on the face of the patient, the position of the first reference mark with respect to the second reference mark is then determined in order to deduce therefrom the curvature of the frame.

Although this type of apparatus is efficient, and does already make it possible to provide a good assessment of the curvature, it is necessary to provide even more accurate values of the inclination of the receiving half-parts. Above all, it is now necessary to offer simple equipment that does not require the people intended to use them to have any particular skills.

Thus, a problem that then arises and that the present invention aims to resolve, is to provide an apparatus that makes it possible to accurately obtain more accurate values of the curvature and also that is simple to use.

In order to resolve this problem, the present invention proposes an apparatus for determining the orientation of ophthalmic lenses belonging to a frame. This apparatus comprises, on the one hand, a recording device and, on the other hand, a reference-frame unit that can be installed on a frame while a patient is wearing it. Said frame has two receiving half-parts able to receive ophthalmic lenses and a central bridge that links said two half-parts; said two half-parts extending symmetrically to one another relative to said central bridge. Said reference-frame unit comprises two independent elements, a first element forming an arch having a central portion marked with a first reference mark and two fixing ends designed to be fitted respectively into the lateral edges of said half-parts to keep said central portion away from said frame, and a second element marked with a second reference mark, fitted onto said frame between the two lateral edges, said recording device comprising a camera pointing at the eyes of said patient from a determined viewing angle in order to record an image of said reference-frame unit fitted onto said frame. Said apparatus comprises processing means for assessing, from said image, the relative position of the two reference marks and for providing a value representative of the inclination of said half-parts relative to one another. According to the invention, the apparatus also comprises another camera separated vertically from said one camera and pointing at the eyes of said patient from another viewing angle; and the two cameras can be used to simultaneously record two images of said reference-frame unit fitted onto said frame from the two viewing angles in order to accurately assess the relative position of the two reference marks and to provide a value representative of the inclination of said half-parts.

SUMMARY OF THE INVENTION

Thus, one characteristic of the invention lies in the use of a second camera in order to simultaneously record the two images of the reference-frame unit fitted onto said frame from the two distinct viewing angles. It is specified that the simultaneous recording of the two images means that the two recordings are taken at exactly the same instant or at instants that are very close together, provided that the patient remains immobile between these two instants. This way, knowing the position of said cameras, the viewing angles and the position of the patient relative to the cameras, the two apparent distances that separate the two reference marks are measured on the two recorded images and the real distance, and consequently the curvature, are deduced therefrom. How this value corresponding to the inclination of the receiving half parts relative to one another can be obtained will be explained in more detail hereinafter in the description.

According to a particularly advantageous embodiment, said second element of said reference-frame unit is fitted onto said central bridge. Thus, the curvature is measured with even greater accuracy. Specifically, since the element forming an arch is joined to the frame via its fixing ends fitted to the lateral edges of the half-parts, which makes it possible to keep said central portion substantially perpendicular to said main plane of symmetry, regardless of the curvature of the frame, the variations of the curvature of the frame induce large amplitude variations in the position of the central bridge.

Furthermore, said element forming an arch has calibration reference marks, that is to say, at least two calibration reference marks separated from one another by a known determined distance, for example 110 mm, so as to be able to deduce therefrom the apparent distance between the first and second reference marks that appear on the images by applying a simple rule of three. The expression "apparent distance" is used here because the first and second reference marks are not a priori located in the same plane. However, on the one hand, the two calibration reference marks spaced apart from one another will be adjusted to the greatest possible distance and on the central portion and, on the other hand, the position of the cameras and of the patient will be adjusted so that the calibration reference marks are located in one and the same plane on the images. Such a characteristic is obtained if the optical axis of the optical system of the cameras is perpendicular to the segment defined by the calibration reference marks.

Moreover, with said first element defining a median plane of the first element, said central portion advantageously comprises a projecting rod or barrel that extends substantially perpendicularly to said median plane of the first element, and said first reference mark is located on said free end of said rod. In this way, not only is the distance between the two reference marks increased further, because the apparent distances that separate the central bridge and the first reference mark on the images supplied by the two cameras are further increased, which makes it possible to increase the measurement accuracy, but also is the viewing angle of the cameras easily calculated relative to the rod.

To do this, said processing means include an angle calculation module, for determining the angle of said projecting rod relative to said viewing angles. This calculation is performed using calibration reference marks, by virtue of which a hypothetical line is produced on the images, from which line the distance that separates it from the first reference marks is measured. Furthermore, said angle measurement module is designed to also calculate the pantoscopic angle of said frame, that is to say the angle of the median plane of the frame relative to the vertical.

Furthermore, said processing means include a lens/eye distance calculation module for determining, from the value representative of the inclination of said half-parts, the distance that separates the eyes of the patient from the ophthalmic lenses. To do this, it is necessary to also know the distance that separates the eyes of the patient from the first reference mark. Therefore, said processing means can also be used to assess, from said images, the relative position of said first reference mark and of the reflection of the light on the apex of the corneas, the corneal reflections, so that the calculation module then determines the distance that separates the eyes of the patient from the ophthalmic lenses. As will be specified in the detailed description, the corneal reflections are manifested, on the images, by a small-diameter off-white spot on the cornea. In this way, all the parameters necessary for the adjustment of the ophthalmic lenses in a frame are likely to be determined by the apparatus according to the invention.

Advantageously, said cameras are fitted in a vertical plane so as to obtain two images on which the apparent distances that separate the first and second reference marks are as far apart as possible from one another. Specifically, the barrel-forming projecting rod bearing the first reference mark and the second element bearing the second reference mark and located on the central bridge are contained in a substantially vertical plane. In this way, the cameras give two images on which the distance variation amplitude between the two reference marks is maximum and consequently, a greater accuracy is obtained in the curvature calculation, as will be explained hereinbelow.

According to a second aspect, the present invention relates to a method for determining the orientation of the ophthalmic lenses belonging to a frame, said method being of the type whereby:

a recording device and a reference-frame unit are provided, which unit can be fitted on a frame worn by a patient, said frame having two receiving half-parts able to receive ophthalmic lenses and a central bridge linking said two half-parts, said two half-parts extending symmetrically to one another relative to said central bridge, said reference-frame unit comprising two independent elements, a first element forming an arch having a central portion marked with a first reference mark and two fixing ends designed to be fitted respectively into the lateral edges of said half-parts in order to keep said central portion away from said frame, and a second element marked with a second reference mark, fitted onto said frame between the two lateral edges, said recording device comprising a camera pointing at the eyes of said patient from a determined viewing angle;

an image of said reference-frame unit fitted onto said frame is recorded;

from said image, the relative position of the two reference marks is assessed; and, a value representative of the inclination of said half-parts relative to one another is provided.

According to the invention, said method also comprises the following steps:

another camera is provided that is separated vertically from said one camera and pointing at the eyes of said patient from another viewing angle;

two images of said reference-frame unit fitted onto said frame are recorded simultaneously from the two viewing angles; and, the relative position of the two reference marks is accurately assessed in order to provide a value representative of the inclination of said half-parts.

BRIEF DESCRIPTION OF THE DRAWINGS

Other particular features and advantages of the invention will become apparent from reading the following description of a particular embodiment of the invention, given as an indicative but nonlimiting example, with reference to the appended drawings in which:

FIG. 1 is a diagrammatic front view of the eyes of a patient provided with elements of the apparatus according to the invention;

FIG. 2 is a diagrammatic plan view according to the arrow II of the elements represented in figure 1;

FIG. 3 is a diagrammatic side view according to the arrow III of the elements represented in FIG. 2;

FIG. 4 is a diagrammatic representation of the apparatus according to the invention; and, FIG. 5 is a block diagram of an element of the apparatus according to the invention.

DESCRIPTION OF PREFERRED EMBODIMENTS

FIG. 1 illustrates a pair of spectacles 10 fitted on the face 12 of a patient. This pair of spectacles 10 has a frame 14 equipped with two arms 16, and two ophthalmic lenses 20, 22 which extend respectively in front of the eyes 19, 21 of the patient. The frame 14 has two receiving half-parts 11, 13 designed to receive the ophthalmic lenses 20, 22 and a central bridge 15 that links the two receiving half-parts 11, 13. Furthermore, the frame 14 is equipped with a first arch-forming reference-frame element 24. This first element 24 has a central portion 26 which extends longitudinally between two opposite ends 28, 30, which respectively include a fixing end 32. The fixing end 32 has a front arm 34 able to rest in front of the ophthalmic lenses 20, 22, and opposite, a shorter, rear arm 36 resting behind the ophthalmic lenses 20, 22. Thus, the fixing ends 32 overlap the ophthalmic lenses 20, 22 and respectively the lateral edges 35, 37 of the two receiving half-parts 11, 13, in the vicinity of the two respective arms 16, 18 of the frame 14, while leaving the visual space of the patient free. The first element 24 which is thus totally attached to the frame 14, has two opposite calibration reference marks 38, 40 respectively fitted at the two opposite ends 28, 30.

These two calibration reference marks 38, 40 respectively present a white-colored mark in the form of a disk with a black dot 42, 44 at its center. Furthermore, the two black dots 42, 44 are spaced apart by a known distance, for example equal to exactly 110 mm.

Moreover, as will be seen in this FIG. 1, the representation of the pupils 46, 48 of the eyes 19, 21 of the patient, which pupils 46, 48 are able to present, in their center, an off-white mark corresponding to the reflection of the light, whether natural or artificial, at the apex of the cornea. When the space in which the apparatus is located is dark, an artificial light will advantageously be provided to emphasize the abovementioned off-white mark on the apex of the cornea. This off-white mark on a black background can easily be identified by automatic image processing means and corresponds substantially to a point on the straight line corresponding to the optical axis of the eye.

The first arch-forming reference-frame element 24 defines a median plane Pm substantially parallel to the plane of FIG. 1, and the central portion 26 includes a barrel-forming projecting rod 50 at the end 52 of which a first positioning reference mark 54 is marked. Just like the opposite calibration reference marks 38, 40, this first positioning reference mark 54 has an off-white colored mark in the form of a disk and a black dot at its center.

Furthermore, the central bridge 15 of the frame 14 has a second reference-frame element 56 consisting of a pellet glued onto this central bridge 15. This pellet has a second positioning reference mark 58 also consisting of a white-colored disk with a black dot at its center.

The first reference-frame element 24 and the second reference-frame element 56 constitute the two elements of a reference-frame unit for which the cooperation mode will be explained hereinbelow.

Reference should now be made to FIG. 2, showing, in a plan view, the elements represented in FIG. 1. This FIG. 2 shows the two receiving half-parts 11, 13 symmetrical to one another relative to a vertical plane of symmetry P intersecting the central bridge 15. These two receiving half-parts 11, 13 respectively define two half-planes P1, P2, intersecting the vertical plane of symmetry P at the level of the central bridge 15 by defining one and the same straight line Dt. A plane P3 perpendicular to the vertical plane of symmetry P and containing the straight line Dt is parallel to the median plane Pm of the first reference-frame element 24 and it can be used to define the curvature of the frame 14. Specifically, the curvature corresponds to the angle formed respectively by the two half-planes P1, P2, and the plane P3 perpendicular to the main plane of symmetry P. It will be also be observed that this curvature can also be defined as being the inclination of the two half-planes P1, P2 relative to one another, an inclination of 180° corresponding to a zero curvature. Furthermore, it will be noted that the first positioning reference mark 54 and the second positioning reference mark 58 are both intersected by the vertical plane of symmetry P and that, the greater the curvature of the frame 14, the closer together these two positioning reference marks 54, 58 become, and, conversely, that the lesser the curvature, the more distanced from one another these two positioning reference marks 54, 58 become. Thus, the principle of the apparatus according to the invention lies notably in the measurement of this distance between the two positioning reference marks 54, 58, in order to determine the curvature.

FIG. 3, which illustrates a side view according to the arrow III, shows elements represented in FIG. 2, the barrel 50 and the pellet 56 glued onto the bridge 15, and more specifically in the plane of FIG. 3, the distance d that separates the two positioning reference marks, one 54 at the end 52 of the barrel 50, the other 58 on the pellet 56.

The apparatus according to the invention also comprises a recording device represented in FIG. 4 and comprising two CCD-type digital cameras, a top one 60 and a bottom one 62, separated vertically from one another by a determined distance a and pointing at the face 12 of the patient at a distance D from the latter. The apparatus also includes processing means 63 represented in FIG. 5. These processing means 63 include an image processing module 65 that can be used to assess, from the images supplied and recorded by the cameras 60, 62, notably the relative position of the two positioning reference marks 54 and 58, as will be detailed hereinbelow. They also include a calculation module 67 that can be used to assess the inclination of the first reference-frame element 24 relative to the vertical by virtue of the calibration reference marks 38, 40 and the first positioning reference mark 54.

The patient is then fitted with the frame 14 which is provided with its second reference-frame element 56 consisting of a pellet glued onto the central bridge 15 and including the second positioning reference mark 58; the frame 14 being equipped with its first reference-frame element 24 including the first positioning reference mark 54.

Thus, two images of the face 12 of the patient are recorded respectively and simultaneously via the two cameras 60, 62 and from two different viewing angles, one 64 substantially horizontal, the other 66 close to 20° relative to the horizontal.

FIG. 1 then illustrates the image viewed by the top camera 60 from the substantially horizontal viewing angle 64. Firstly, the processing means 63, via the image processing module 65 and the calculation module 67, determine the angle formed by the axis A of the barrel 50 relative to the viewing angle 64 of the top camera 60. To do this, the image processing module 65 hypothetically defines a line intersecting the two calibration reference marks 38, 45 and then measures, in the plane of the image, for example by counting pixels, the distance d0 that separates the first positioning reference mark 54 from the barrel and this hypothetical line in a perpendicular direction. The length l of the barrel 50 being known, the central portion 26 extending in one and the same plane Pm, and the two calibration reference marks 38, 45 being spaced apart by a known distance, in this case by 110 mm, the calculation module 67 naturally deduces, from the distance that separates the first positioning reference mark 54 from the hypothetical line, the angle of inclination of the axis A of the barrel 50 relative to the viewing angle 64.

Obviously, this angle is also measured in the same way on the image recorded via the bottom camera 62, relative to the other viewing angle 66.

Furthermore, the processing means make it possible to measure, on each of the images, the apparent distances d1, d2 between the positioning reference marks 54, 58, and that appear represented in FIG. 3.

In this way, knowing the viewing angles 64, 66 and the orientation of the axis A of the barrel 50 relative to these viewing angles, and also by determining the apparent distances d1, d2, the calculation module 67 deduces therefrom the real distance d that separates the two positioning reference marks 54, 58.

Reference should be made once again to FIG. 2 to show how it is possible, from this real distance d that separates the two positioning reference marks 54, 58, to calculate the angle α, or curvature of the frame.

The dimensions of the fixing ends 32 are also determined, and they make it possible to ascertain the exact distance d4 that separates the central portion 26 from the lateral edges 35, 37 of the two receiving half-parts 11, 13. The distance that separates, along the central portion 26, the two fixing ends 32 is also known. Furthermore, by virtue of the real distance d, the position of the abovementioned plane P3, which is tangential to the central bridge 15 at the level of the second positioning reference mark 58, is determined. The inclination of the two half-planes P1 and P2 relative to the plane P3 perpendicular to the plane of symmetry P, and consequently the curvature value, are then deduced therefrom, via the calculation module 67. The processing means 63 have a display terminal 69 for displaying the results of the abovementioned calculations.

Moreover, to obtain full knowledge of the ophthalmic parameters, the apparatus also makes it possible to determine the distancer $d_{vo}$ that separates the ophthalmic lens from the eye. Thus, according to the same calculation principle, the calculation module 67 firstly determines, by virtue of the two images from the abovementioned two cameras 60, 62, and via the image processing module 65, the distance that separates the two reflections of the cornea that appear white in the images, from the first positioning reference mark 54 situated at the end 52 of the barrel 50.

The three-dimensional coordinates of each of the apexes of the corneas are then obtained. Since the curvature of the frame has already been calculated, the calculation module 67 can calculate the coordinates of each of the points of the frame and, more specifically, the coordinates of the intersection of the points of the frame and of the axis of the cornea and, consequently, of the eye. It then deduces therefrom the distance that separates the ophthalmic lens from the eye.

What is claimed is:

1. An apparatus for determining the orientation of ophthalmic lenses belonging to a frame, said apparatus comprising, on the one hand, a recording device and, on the other hand, a reference-frame unit that can be fitted on a frame while the patient is wearing it, said frame having two receiving half-parts able to receive ophthalmic lenses and a central bridge that links said two half-parts, said two half-parts extending symmetrically to one another relative to said central bridge, said reference-frame unit comprising two independent elements, a first element forming an arch having a central portion marked with a first reference mark and two fixing ends designed to be fitted respectively into the lateral edges of said half-parts to keep said central portion away from said frame, and a second element marked with a second reference mark, fitted onto said frame between the two lateral edges, said recording device comprising a camera pointing at the eyes of said patient from a determined viewing angle in order to record an image of said reference-frame unit fitted onto said frame, said apparatus comprising processing means for assessing, from said image, the relative position of the two reference marks and for providing a value representative of the inclination of said half-parts relative to one another;
wherein it also comprises another camera separated vertically from said one camera and pointing at the eyes of said patient from another viewing angle;
and in that the two cameras can be used to simultaneously record two images of said reference-frame unit fitted onto said frame from the two viewing angles in order to accurately assess the relative position of the two reference marks and to provide a value representative of the inclination of said half-parts.

2. The apparatus as claimed in claim 1, wherein said second element of said reference-frame unit is fitted onto said central bridge.

3. The installation as claimed in claim 1, wherein said element forming an arch has calibration reference marks.

4. The apparatus as claimed in claim 1, characterized in that wherein, with said first element defining a median plane (Pm) of the first element, said central portion comprises a projecting rod that extends substantially perpendicularly to said median plane of the first element, and in that said first reference mark is located on a free end of said rod.

5. The apparatus as claimed in claim 4, wherein said processing means include an angle calculation module, for determining the angle of said projecting rod relative to said viewing angles.

6. The apparatus as claimed in claim 5, wherein said angle calculation module is designed to also calculate the pantoscopic angle of said frame.

7. The apparatus as claimed in claim 1, wherein said processing means include a lens/eye distance calculation module for determining, from the value representative of the inclination of said half-parts, the distance that separates the eyes of the patient from the ophthalmic lenses.

8. The apparatus as claimed in claim 7, wherein said processing means can be used to assess, from said images, the relative position of said first reference mark and of the corneal reflections for determining the distance that separates the eyes of the patient from the ophthalmic lenses.

9. The apparatus as claimed in claim 1, wherein said cameras are fitted in a vertical plane.

10. A method for determining the orientation of ophthalmic lenses belonging to a frame, said method being of the type whereby:—a recording device and a reference-frame unit are provided, which unit can be fitted on a frame worn by a patient, said frame having two receiving half-parts able to receive ophthalmic lenses and a central bridge linking said two half-parts, said two half-parts extending symmetrically to one another relative to said central bridge, said reference-frame unit comprising two independent elements, a first element forming an arch having a central portion marked with a first reference mark and two fixing ends designed to be fitted respectively into the lateral edges of said half-parts in order to keep said central portion away from said frame, and a second element marked with a second reference mark, fitted onto said frame between the two lateral edges, said recording device comprising a camera pointing at the eyes of said patient from a determined viewing angle—an image of said reference-frame unit fitted onto said frame is recorded;—from said image, the relative position of the two reference marks is assessed; and,—a value representative of the inclination of said half-parts relative to one another is provided; wherein it also comprises the following steps:—another camera is provided that is separated vertically from said one camera and pointing at the eyes of said patient from another viewing angle;—two images of said reference-frame unit fitted onto said frame are recorded simultaneously from the two viewing angles; and,—the relative position of the two reference marks is accurately assessed in order to provide a value representative of the inclination of said half-parts.

11. The method as claimed in claim 10, wherein said second element of said reference-frame unit is fitted onto said central bridge.

* * * * *